(12) United States Patent
Houlihan et al.

(10) Patent No.: US 6,535,713 B1
(45) Date of Patent: Mar. 18, 2003

(54) INTERACTIVE TRAINING APPLICATION

(75) Inventors: Paunpimon A. Houlihan, Owings Mills, MD (US); Trent L. Dennis, Baltimore, MD (US); William V. Murphy, Herndon, VA (US); David Schwartz, Baltimore, MD (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 08/854,124

(22) Filed: May 9, 1997

Related U.S. Application Data

(60) Provisional application No. 60/017,433, filed on May 9, 1996.

(51) Int. Cl.[7] .................................................. G09B 7/00
(52) U.S. Cl. ..................... 434/350; 434/307 R; 463/40; 463/41; 463/42
(58) Field of Search ................................. 434/323, 322, 434/118, 350–351, 362–365, 307 R, 308; 463/40–42

(56) References Cited

U.S. PATENT DOCUMENTS

| | | | | |
|---|---|---|---|---|
| 4,622,013 A | * | 11/1986 | Cerchio ....................... 434/323 |
| 4,636,174 A | * | 1/1987 | Anderson .................... 434/335 |
| 4,764,120 A | * | 8/1988 | Griffin et al. ................ 434/336 |
| 5,002,491 A | * | 3/1991 | Abrahamson et al. ...... 434/322 |
| 5,432,940 A | * | 7/1995 | Potts et al. .................. 395/700 |
| 5,597,312 A | * | 1/1997 | Bloom et al. ................ 434/362 |
| 5,727,950 A | * | 3/1998 | Cook et al. .................. 434/350 |
| 5,890,911 A | * | 4/1999 | Griswold et al. ........... 434/322 |
| 5,904,485 A | * | 5/1999 | Siefert ......................... 434/322 |
| 6,162,060 A | * | 12/2000 | Richard et al. ............. 434/118 |

\* cited by examiner

*Primary Examiner*—Jessica Harrison
*Assistant Examiner*—Aaron L. Enatsky
(74) *Attorney, Agent, or Firm*—Leonard C. Suchyta; Loren C. Swingle; Rader, Fishman & Grauer PLLC

(57) ABSTRACT

An interactive training application has three components: a lesson engine, a lesson delivery system, and a lesson authoring tool. The lesson engine runs an interactive, multimedia training exercise based on the contents of a lesson file, which comprises a plurality of pages. Each page includes a navigation item, associated with another page, and a reference to multimedia content. The lesson delivery system displays a menu of lessons to a student, fetches a lesson file corresponding to the student's selection, and invokes the lesson engine upon the lesson file. The lesson authoring tool provides a graphical interface for inputting and editing storyboards, from which the lesson authoring tool is configured for generating a lesson file.

22 Claims, 8 Drawing Sheets

(STORYBOARD FORM EXAMPLE)

INTERACTIVE TRAINING APPLICATION

RELATED APPLICATION

This application claims the benefit of U.S. Provisional Application No. 60/017,433, entitled "Interactive Training Application," filed on May 9, 1996 by David Schwartz, Paunpimon A. Houlihan, William V. Murphy, and Trent Dennis.

TECHNICAL FIELD

The present invention relates to computer-aided instruction and, more particularly, to networked, interactive computer-based, corporate training.

BACKGROUND ART

In the corporate world, employee training is crucial for the long term economic health of a company. As the economy is becoming increasingly technology driven, the pace of business is rapidly accelerating. Information can be communicated across the globe in minutes, if not seconds. Financial transactions occur around the clock. Accordingly, business opportunities can spring up in an instant, only to vanish in a short time.

To meet these challenges, organizations have been radically re-engineering their work flow processes, e.g., by adopting just in time delivery of supplies. Firms have also been restructuring their operations and organization.

For example, the benefits obtained from being first to market with a new product or service can be squandered if the sales associates do not know about or properly understand the new offering. As another example, a business may need to modify its customer care policy in response to a rapidly changing market. In these examples, disseminating information through the enterprise quickly and effectively is critical for success.

Traditional approaches to corporate training, however, are becoming less effective in the current economic climate. Most corporate training still follows the leader-led training model. In the leader-led training model, an instructor would lecture before a classroom of students, asking questions, eliciting class participation, and assigning exercises to do. In other words, traditional corporate training is essentially similar to what happens in high-school, college, and university classrooms.

The disadvantages to leader-led corporate training are becoming increasingly apparent. Leader-led training suffers from its high costs and moderate effectiveness.

In many cases, corporate training centers are centrally located. Accordingly, students must travel to a training center. Often, the corporate training center is located in another city or state, necessitating travel and overnight accommodations. Thus, there is a need for reducing out-of-pocket training costs, especially in travel and accommodations, which consume up to 70% of the training budget.

Another reason contributing to the expense of out-of-town training is the travel time used by the employee. The more time taken for travel, the less time the employee has for more productive tasks. Thus, there is a need for improving employee job productivity.

The second drawback to leader-led training is in the area of effectiveness. Leader-led training is often boring, and a bored employee is not a satisfied employee. Unsatisfied employees are less productive and may leave the company, creating turnover. Thus, there is a need for interesting and enjoyable instruction.

Conventionally, an instructor lectures a classroom of students. Each student learns at a different pace, causing difficulties for the instructor. If the pace of the instruction is too fast, the slower students get lost and do not learn. If the pace of instruction is too slow, then the brighter students get bored and tune out. In any event, the faster learners are instructed at the same pace as slower learners, necessitating more time away from the job. Thus, there is a need for training students at their own pace.

Another aspect to the effectiveness in corporate training is in the consistency of the information being taught. If a large number of employees must be provided with information, then several instructors must be hired. However, these instructors are human and thus teach the same material differently. Thus, there is a need for consistency in the corporate training.

Retention is an important goal in corporate instruction. Traditional leader-led instruction mainly involves lecturing and, perhaps, projecting slides or drawing on a chalkboard. However, these methods have not been found to be highly effective. For example, one study has shown that on average people remember only 20% of what they see or hear and 40% of what they both see and hear. Thus, there is a need for increasing the retention level of training.

Another area in which leader-led training is becoming more disadvantageous is in being up-to-date. With the fast pace of today's technological world, it is imperative to update the training material at once to reflect the new products, services, or information and immediately disseminate the material to the work force. Thus, there is a need for quickly updating the training materials.

Broadly, the concept of computer-aided instruction has been around for some time to generally address some of the drawbacks associated with leader-based training. However, conventional computer-based training techniques have not been satisfactorily applied to the corporate training environment in particular.

For example, computer-based learning systems have very specific hardware requirements, but companies typically own a range of incompatible computers, from personal computers (PCs) or multi-user minicomputers and mainframes. Equipping all their distributed learning centers with specialized hardware can be very expensive. Thus, there is a need for resource flexibility.

Often the software in a computer-based training system is so specific to a particular course that creating computerized teaching material for a new class requires writing the software again from scratch. Rewriting the software is time-consuming and expensive. Thus, there is a need for reducing the development time and costs training programs.

When each computerized course is created separately, the user interface of one course often different from the user interface of another course, forcing each student to learn a new way of interacting with the program. Accordingly, some of the time spent with the computer is spent on learning to use the program rather than the material intended to be taught. Thus, there is a need for improving employee training productivity.

Therefore, it is desirable to provide a computer-based training system that is applicable to today's fast-paced, technology-driven corporate world.

DISCLOSURE OF THE INVENTION

One object of the invention is to provide a network for delivering computer-based training materials and instruction.

Another object of the invention is to provide interactive computer-based instruction.

Still another object of the invention is presenting instructional materials in a multimedia format.

According to the present invention, the foregoing and other objects and advantages are attained by a method and software for instructing a student based on courseware. Courseware includes multimedia content and lesson files. A lesson file has a number of pages. Each page includes a reference to multimedia content and a navigational item associated with another page. The method and software include the step of instructing a student based on a page of a lesson file. In addition, a navigational control associated with the navigational item is displayed. When activation of the navigational control is detected, the student is further instructed based on the page associated with the navigational item.

According to another aspect of the invention, an interactive training network comprises a storage device for the storing the courseware and workstations. These workstations are networked to the storage device and have means for retrieving a lesson file and multimedia content referenced in the lesson file from the storage device based on input from a student. The workstations further have means for instructing the student according to the lesson file and the multimedia content.

According to another aspect of the invention, a method and software for interactive training includes the step of storing courseware. A lesson file and multimedia content referenced in the lesson file is retrieved based on input from a student. The student is instructed according to the lesson file and the multimedia content.

In another aspect, a platform-independent, interactive training network has a storage device for storing courseware. A first training means retrieves the courseware and runs it in a first operating environment. A second training means retrieves the same course and runs it in a second operating environment that is mutually incompatible with the first operating environment.

Accordingly, another aspect is attained by a tool, method, and software for authoring lessons. A storyboard, which includes a navigational item to another storyboard and a reference to multimedia content, is input and stored in a database. Storyboards are retrieved from the database and are used to generate a lesson file, which has a number of pages. Each page includes a reference to multimedia content and a navigational item associated with another pages.

Additional objects, advantages, and novel features of the invention will be set forth in part in the description which follows, and in part will become apparent upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The present invention is illustrated by way of example, and not by way of limitation, in the figures of the accompanying drawings and in which like reference numerals refer to similar elements and in which.

BEST MODE FOR CARRYING OUT THE INVENTION

A method and apparatus for interactive training are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Network and Hardware Overview

Figure 1:
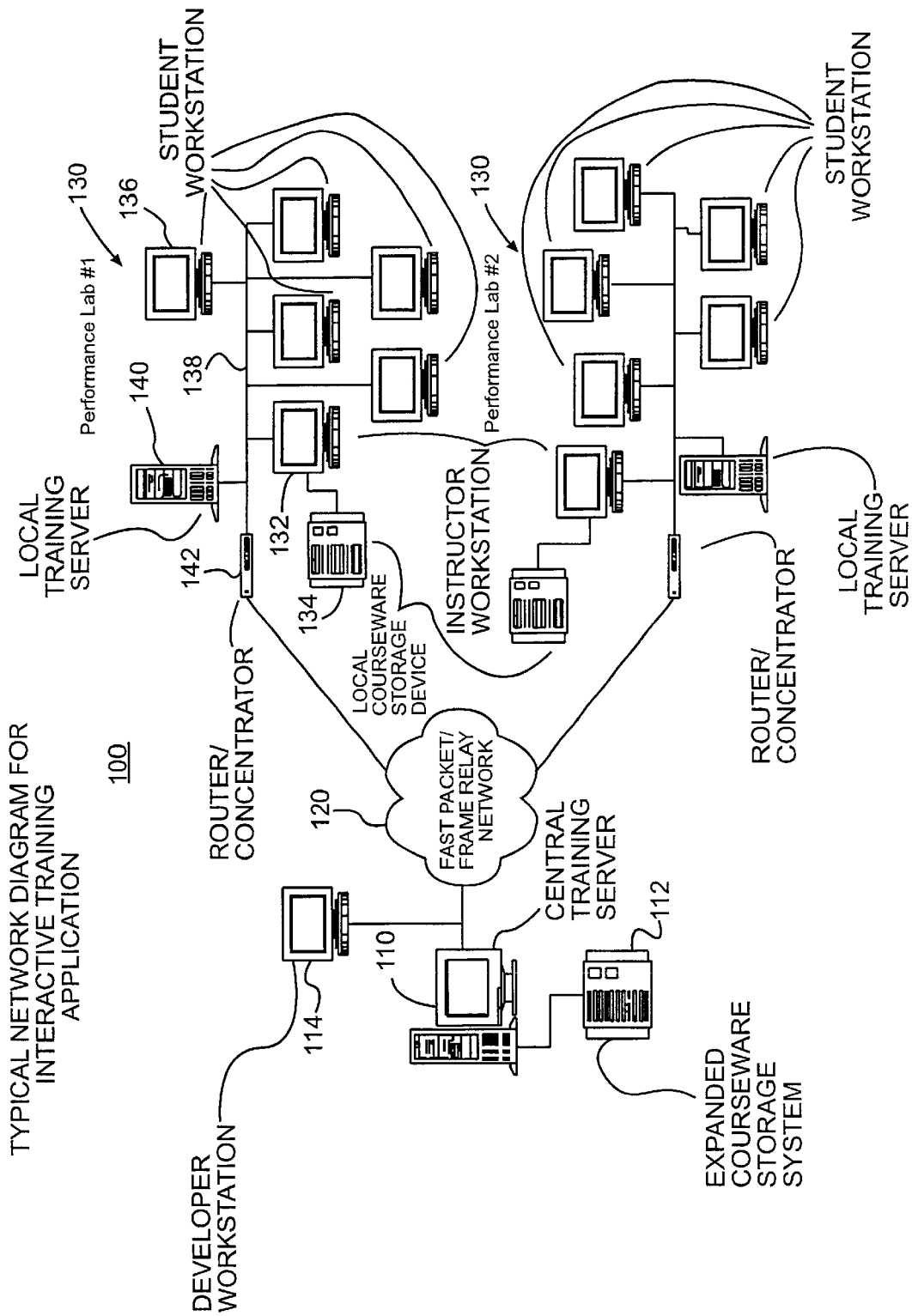
FIG. 1 depicts an interactive training network according to an embodiment.

Referring to FIG. 1, depicted is a diagram of an interactive, multimedia training network 100 upon which an embodiment of the present invention can be implemented. Network 100 includes sites for developing, delivering, and running interactive, multimedia courseware.

More specifically, courseware is developed on a central training server 110. The central training server 110 may connect to an expanded courseware storage system 112, preferably a high-capacity hard disk storage system.

Members of a courseware development team operate one or more developer workstations 114, using an inventive lesson authoring tool. The developer workstations may be networked to the central training server 110 in a local area network or communicate with that server via a wide area data network 120. When the courseware developers create new courseware, it is loaded on the central training server 110.

Accordingly, the central training server 110 stores the master copies of all the courseware for the training network 100. The central training server 110 communicates with a number of performance labs 130 via a wide area data network 120, which may be a fast packet network, a frame relay network, or the like. The central training server 110 is also configured for downloading courseware to each performance lab 130, when the courseware is developed, tested, and approved. In addition, the performance labs 130 upload and download data to the central training server 110 on a periodic basis, daily or weekly, during off-hours to ensure that the most up-to-date courseware is available in each performance lab 130.

The performance labs 130 are the actual classrooms, and the training network 100 may comprise any number of performance labs 130. Two such performance labs 130 are depicted in FIG. 1. Each performance lab 130 includes an instructor workstation 132 and associated local courseware storage device 134. Preferably, the local courseware storage device 134 is a workstation with 4.2 GB hard drives. Each local courseware storage device 134 is accessible to central training server 110 via wide area data network 120 for loading the most recent courseware.

Each performance lab 130 includes a number of student workstations 136, preferably six or eight. The student workstations 136 can be set up in a classroom-like environment with an overhead projector, chalkboard, etc. This configuration allows the benefits of interactive, multimedia training to be obtained while still keeping the class relatively small for human interaction and permitting supplemental leader-led training if necessary.

Figure 2:
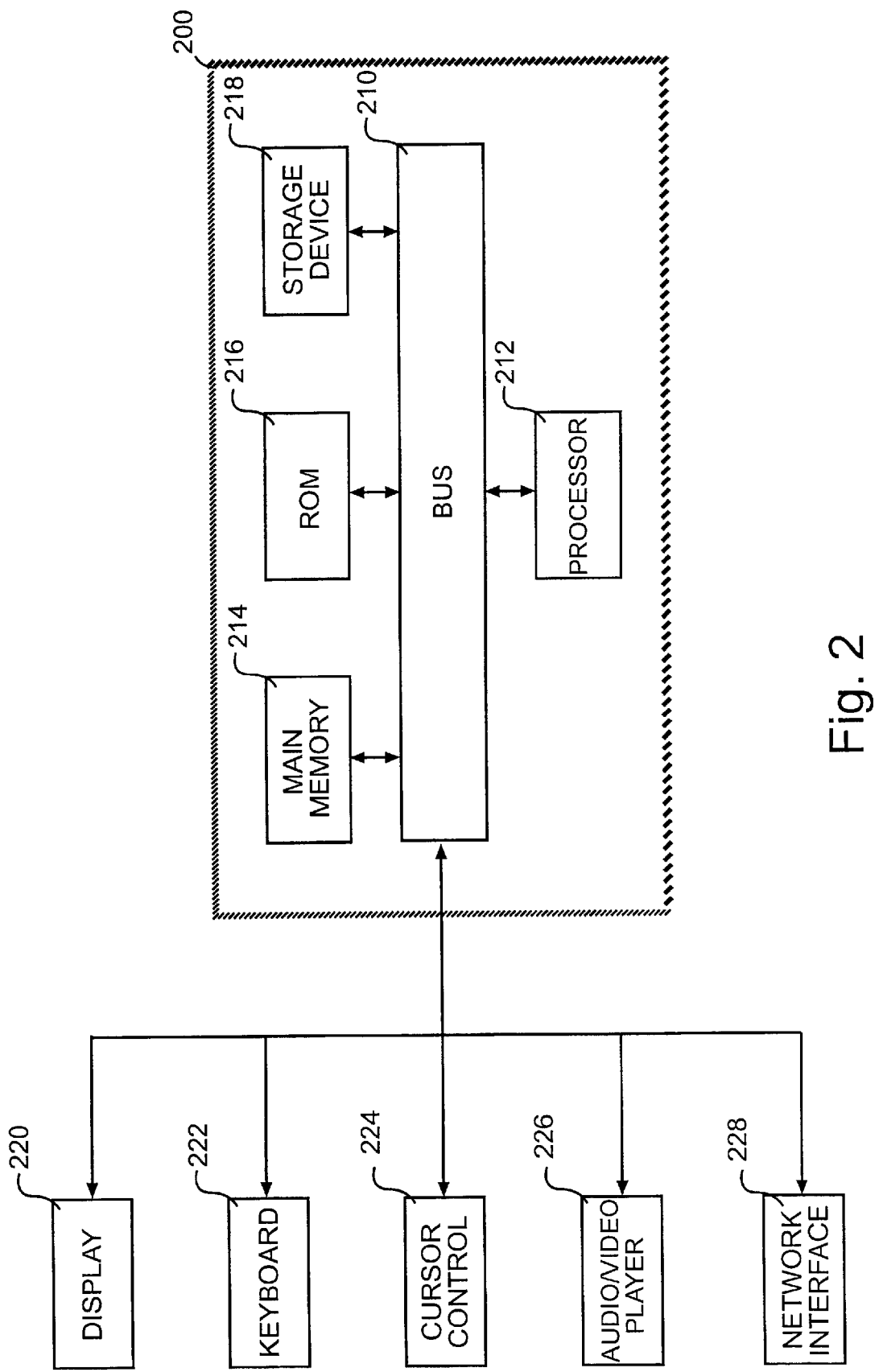
FIG. 2 depicts a workstation upon which an embodiment can be implemented.

The student workstations 136 are preferably high-performance PCs set up for multimedia processing, but may be any comparable computer system. Referring to FIG. 2, depicted is a block diagram of a workstation. Workstation 200 includes a bus 210 or other communication mechanism for communicating information, and a processor 212 coupled with bus 210 for processing information. Workstation 200 further comprises a random access memory (RAM) or other dynamic storage device 214 (referred to as main memory), coupled to bus 201 for storing information and instructions to be executed by processor 212. In a preferred embodiment, workstation 200 contains about 64 MB of main memory.

Workstation 200 also comprises a read only memory (ROM) and/or other static storage device 216 coupled to bus 210 for storing static information and instructions for processor 212. Data storage device 218, such as a magnetic disk or optical disk and its corresponding disk drive, can be coupled to bus 210 for further storage, preferably 2 GB, of information and instructions.

Workstation 200 can also be coupled via bus 210 to a display device 220, such as a cathode ray tube (CRT), for displaying information to a student. Workstation 200 further includes input devices, for example, a keyboard 222 and a cursor control device 224, such as a mouse. In addition, workstation 200 includes multimedia audio/video player 226 for outputting sound and images to the student. Finally, workstation 200 is connected to a network, via network interface device 228.

The present invention is related to the use of workstation 200 for interactive training. According to one embodiment, interactive training is performed by workstation 200 in response to processor 212 executing sequences of instructions contained in memory 214. Such instructions may be read into memory 214 from another computer-readable medium, such as data storage 218. Execution of the sequences of instructions contained in memory 214 causes processor 212 to perform the process steps that will be described hereafter. In alternative embodiments, hard-wired circuitry may be used in place of or in combination with software instructions to implement the present invention. Thus, the present invention is not limited to any specific combination of hardware circuitry and software.

The courseware resides on local courseware storage device 134. As the students use the student workstations 136, that courseware is served out via local area network 138 to the storage device 218 within each student workstation 136. The courseware includes lessons files, described in further detail hereafter, and multimedia content, including video, audio, text, graphics, animation, etc.

Each performance lab 130 may also include a local training server 140 for running other application software for ancillary use. For example, local training server 140 may include a tactical sales planning tool or an on-line help system.

The local area network 138 for each performance lab 130 connects to wide area data network 120 through an appropriate network router or concentrator 142. Network router/concentrator 142 provides two-way signal protocol conversions between local area network 138 and wide area data network 120. Courseware is supplied to performance labs 130 via wide area data network 120 and then to student workstations 136 via local area network 138.

By distributing courseware throughout a wide area network, courseware can be immediately and uniformly updated throughout the entire enterprise. Travel costs are virtually eliminated because the material is delivered directly to a performance lab 130 close to the student. The same message can be consistently communicated through the company, because the same courseware is being disseminated without human intervention regarding their content.

Software Overview

Figure 3:
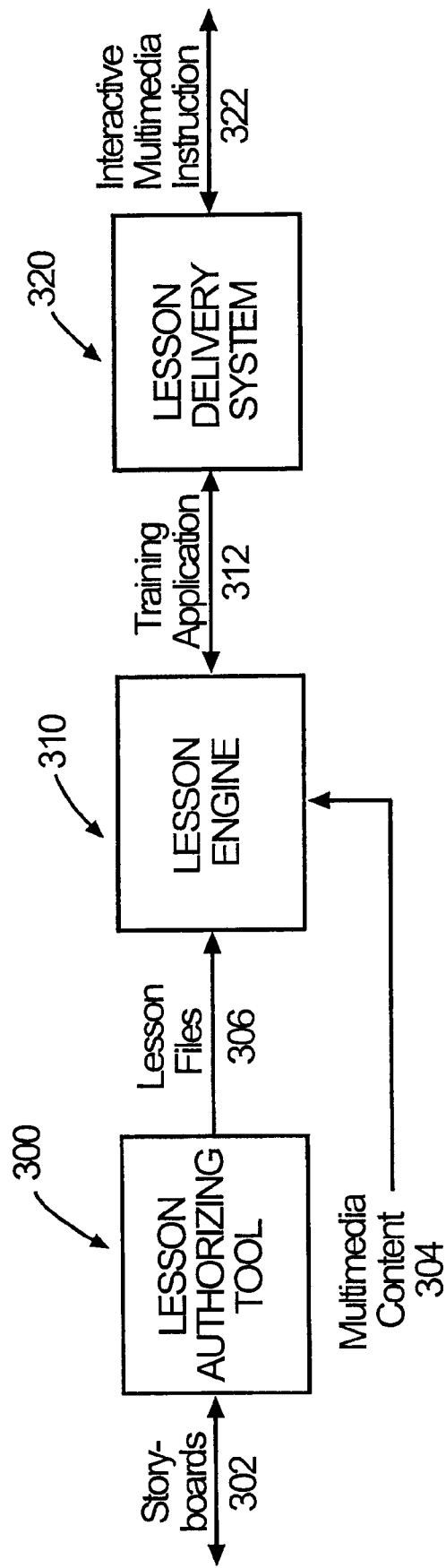
FIG. 3 is a dataflow diagram illustrating the major software modules according to an embodiment.

Referring to FIG. 3, depicted is a dataflow diagram of the major software modules according to an embodiment of the present invention. Courseware is developed through the aid of lesson authoring tool 300, running on developer workstation 114. Developers create and edit storyboards 302 describing each screen a student will encounter along with references to the multimedia that will be presented when the student access that screen. The lesson authoring tool 300 generates a lesson file from a set of storyboards and stores the lesson file on extended courseware storage device 112. In addition, courseware developers produce multimedia content 304 and store the content on extended courseware storage device 112. The internal operation of the lesson authoring tool 300 is described in more detail hereafter.

The central training server 110 downloads courseware, comprising lesson files 306 and multimedia content 304 to local courseware storage device 134. Also downloaded to storage device 134 from the central training server 110 is the latest version of the lesson engine 310. The lesson engine 310, the internal operation of which is described in more detail hereafter, is the software module which reads and interprets a lesson file 306 along with the associated multimedia content 304 to produce a multimedia training application 312. The lesson engine 310 encapsulates the "look-and-feel" of the training applications so that all computer-based training in a network according to an embodiment of the invention can present a consistent user-interface to the students. With a consistent user-interface, students can spend less time learning to use the interactive training application and more time learning the actual material. Consequently, productivity is improved.

The lesson delivery system 320 downloads the courseware, which is a lesson file, multimedia content, and the lesson engine 310 from the local courseware storage device 134 to the student workstation 136 for interactive, multimedia training. The lesson engine 310 is preferably downloaded when the student workstation 136 is booted, and the lesson file and multimedia content is downloaded before each lesson that the interactive, multimedia instruction 322 begins executing.

The software modules for the lesson engine 310 and the lesson delivery system 320 are platform independent, although the preferred embodiment utilizes UNIX-based equipment. The operating environment of a computer is the largest obstacle to platform independence. The operating environment of a computer is the machine language it understands and the operating system commands it executes. Pure executable programs cannot run in a mutually incompatible operating environment because the machine language is different or the operating system commands are inconsistent.

Platform independence is achieved, however, by creating an authoring application that runs in an "authoring" environment on top of the computer's operating environment. An authoring environment specifies at a high-level the kinds of multimedia commands that are to be executed by an authoring application. In a preferred embodiment, the IconAuthor environment from Aimtech in Nashua, N. H., which runs on both PCs and UNIX, provides this platform-independent authoring environment, although persons of skill in the art will readily recognize that other authoring tools may provide equivalent functionality although not for all the same platforms.

Even with a platform-independent authoring environment, platform-independence is difficult to achieve if the authoring application is not properly designed. For example, necessary files may be located in separate locations in the hard disk directory structure. Thus, it is crucial not to hard code such external parameters. Accordingly, one embodiment uses variable files extensively to encapsulate the required external parameters. Variable files contain a list of variables and their values and are read in during the execution of an authoring application to set its variables. Thus, external parameters can be put into variable files to attain platform independence.

Lesson Delivery System

Figure 4:
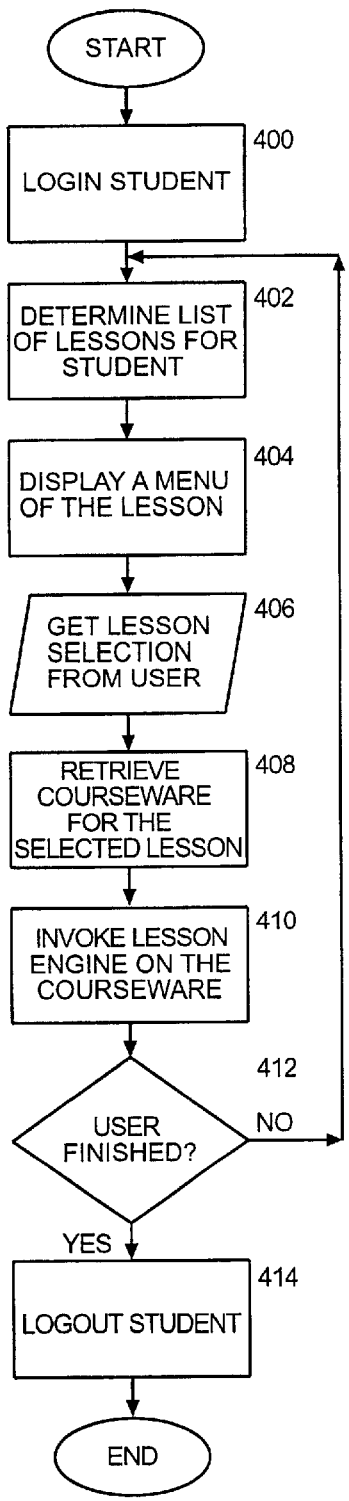
FIG. 4 is a flowchart illustrating the operation of a lesson delivery system according to an embodiment.

The lesson delivery system 320 is a platform independent authoring application and can therefore run in both the PC and UNIX operating environments. The lesson delivery system 320 is a student's interface for the interactive, multimedia training system. The operation of the lesson delivery system 320 during a training session is illustrated by the flowchart in FIG. 4.

In step 400, the lesson delivery system 320 executes the login routine. During the login routine, the student is prompted for a student identifier, such as a name, social security number, or the like, and may include a password. Upon receiving a student identifier, the student identifier is validated. If the student identifier is valid, then information about the student is loaded from a remote database, preferably on instructor workstation 132, and the information is placed in a student variable file accessible to the lesson delivery system 320.

At step 402, the lesson delivery system 320 examines the student variable file to determine the lessons, including quizzes and tests, that the student is permitted to run. Quizzes and tests are, in fact, just another kind of lesson. The lessons available to the student are organized into a menu and displayed to the user (step 404).

Figure 5:
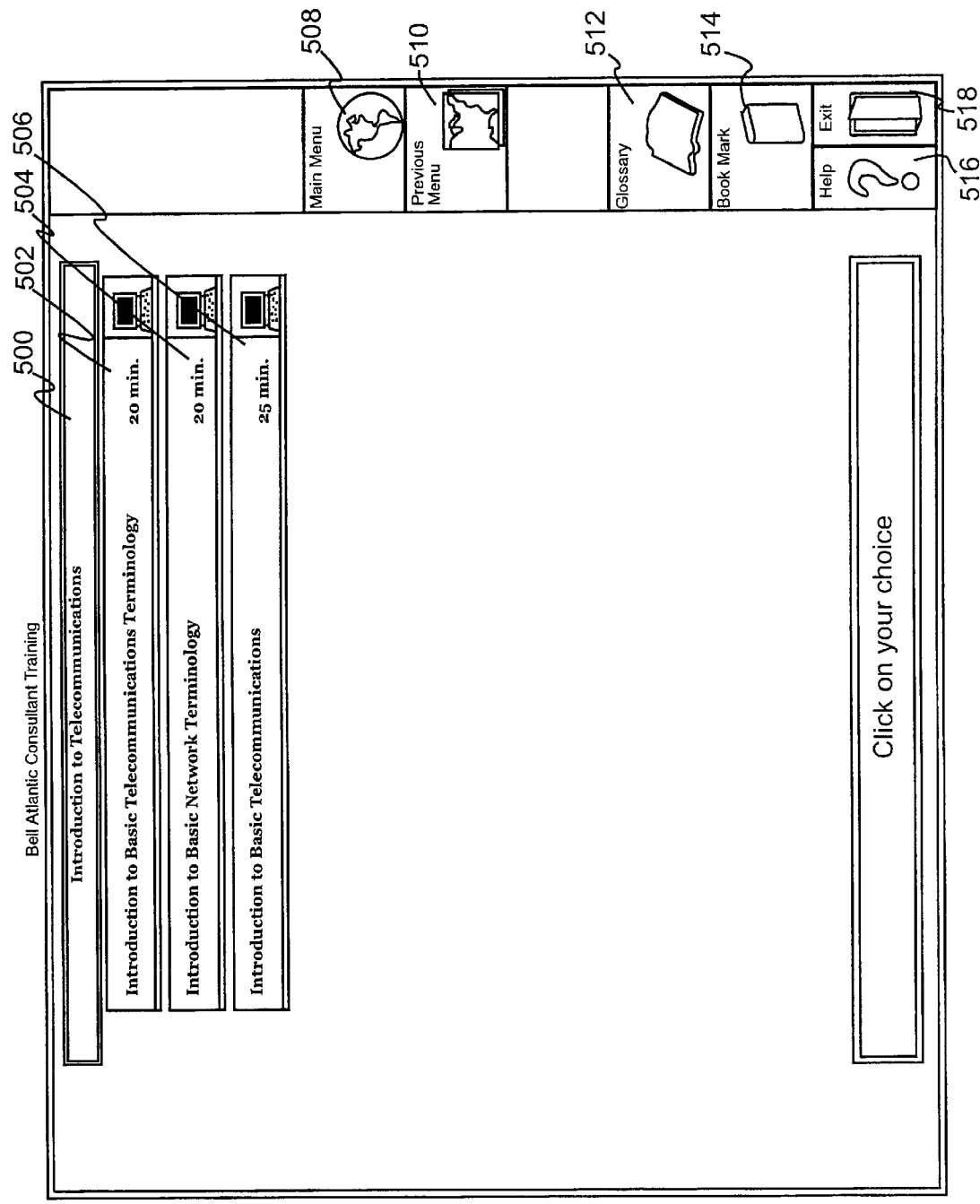
FIG. 5 is a screen display of the lesson delivery system.

FIG. 5 depicts an exemplary lesson menu. The menu includes an information bar 500 which indicates the unit being undertaken. Under the information bar is a list of buttons, 502 to 506, for the various lessons that are available to the student. Buttons 508 and 510 are navigational buttons to allow the student visit other units and modules. Specifically, button 508 brings the student back to the main menu, which is a list of modules, and button 510 brings the student back to previous menu, in this case a unit menu. The menu also has a button 512 for looking of terms in a glossary and a bookmark button 514 for bringing the student back to last menu visited before logging out. In addition, help button 516 and exit button 518 are displayed.

The student selects one of the lessons by positioning a cursor (not shown) over one of the lesson buttons, 502 to 506, and activating it. For example, the student may push a mouse to move the cursor and click on a mouse button to activate the lesson button. Upon activation of the lesson button, the system receives that input as a selection of a particular lesson (step 406).

In response, the system retrieves all the courseware associated with the lesson from local courseware storage device 134. Lesson courseware includes a lesson file and the associated multimedia content. Each lesson is assigned a serial number, and the serial number is embedded in all the file names of the lesson file and the related multimedia content. For example, the lesson file for unit 3, lesson 2 is called "a_003_02.iw" and the various corresponding multimedia content files are named "a00302##.*", where the number signs (#) indicate an incremental number to uniquely identify up to a hundred of multimedia content files and the asterisk (*) indicates the type of the multimedia content. The system retrieves the lesson file and the multimedia content files having the serial number for the embedded lesson, "a_003_02.iw" in the above example.

Once the courseware is retrieved to the student workstation 136, the lesson delivery system 320 invokes another platform-independent program, the lesson engine 310, upon the retrieved courseware (step 410). The operation of the lesson engine 310 is described in more detail hereafter. The lesson delivery system 320 and the lesson engine 310 communicate to each other through variable files. Thus, the lesson delivery system 320 sends the lesson engine 310 a parameter describing the name of the lesson file to be run.

After the lesson has run, the lesson delivery system 320 checks to see if the student is finished (step 412). The student is deemed to have finished the session, when all lessons are completed and all tests are taken or when the student has pressed exit button 518. If the student is finished, then the student is logged out (step 414). Otherwise, execution proceeds back to steps 402 and 404 where the menu of lessons is updated and redisplayed.

By retrieving the lesson courseware through the network only upon request of the student ("store and forward"), the lesson delivery system 320 always uses the most current courseware version for the performance lab 130. This approach helps to ensure that the corporate training being delivered to the student is the most up-to-date and current. Another advantage to this store and forward approach is that the multimedia is not streamed across the network. Video, for example, requires a high-bandwidth channel, which is available from the hard disk but not the network. In another embodiment, the multimedia can be stored on the local courseware storage device 134 in compressed format and uncompress when downloaded to the student workstation 136, reducing storage requirements.

Lesson Engine

Figure 6:
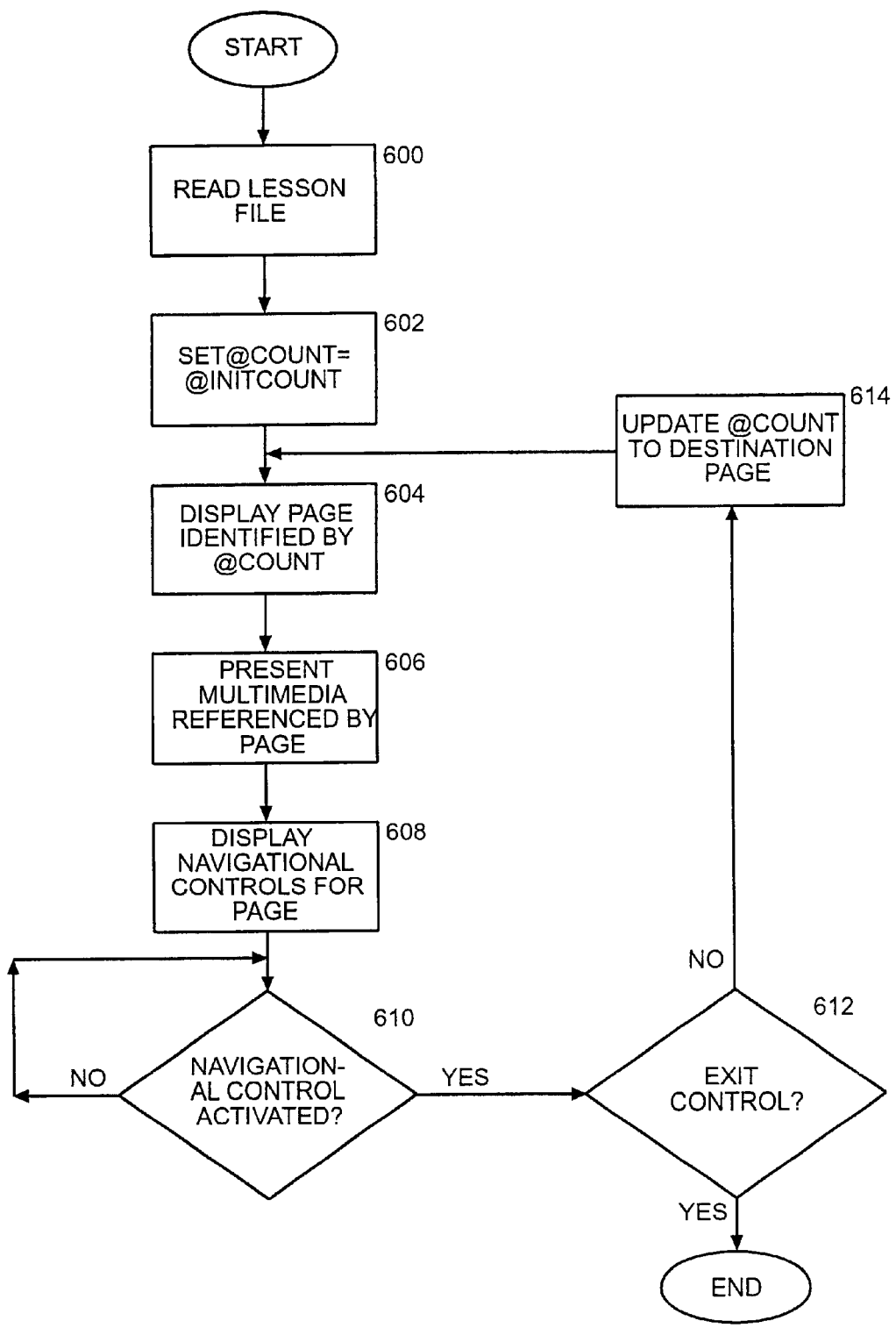
FIG. 6 is a flowchart illustrating the operation of a lesson engine according to an embodiment.

The lesson engine 310 is a platform independent authoring application and can therefore run in both the PC and UNIX operating environments. The lesson engine 310 is the module which is responsible for the interactive, multimedia instruction of a student according to a particular piece of courseware. The operation of the lesson engine 310 during a training session is illustrated by the flowchart in FIG. 6.

At step 600, the lesson engine 300 reads a lesson file 306 as specified by the lesson delivery system 320. A lesson file is a variable file that describes the structure of a particular interactive, multimedia lesson. In specific, the lesson file contains an entry for every displayed page in the lesson, and a global variable, @initcount, that indicates which page is the first page to be displayed.

Information about all pages in the lesson is contained in a series of parallel arrays, indexed by a page number. In particular, the @page[ ] array variable specifies information, especially destination pages, for the navigational controls such as a button. For each page number, the entry in the @page[ ] array variable is that string that contains up to twenty different "positions," separated by the slash character (/). For example, the entry for @page[400005] may be: "exit/exit/3done/4glossary/400010/0/0/0/0/400010/ b2300101.smt/400005/playc;backc/b2300201.smt/0/no wait/0/0/0".

Position 1 of the @page[ ] array variable specifies the page number of the page containing the "main menu." A user indicates a desire to go to the main menu by clicking on a button labelled "main menu." This destination for this button is placed as a matter of convention in position 1. In the example, position 1 is "exit," which directs the lesson to exit the lesson when the button is pressed.

Positions 2, 3, 4, 5, and 6 specify the destination page number when the "previous menu," "done," "glossary," "next," and "back" buttons are respectively activated. In the example, the "next" button, specified at position 5, has the value "400010" meaning that when the "next" button is activated, the page identified by "400010" is to be displayed.

These navigation controls are displayed in the same position on the screen, for example on the right side of the screen, regardless of the particular lesson file being run. Thus, this feature enables all lessons to be run with a consistent user-interface. A consistent user-interface improves productivity because it leverages the user's time in learning to use the computer system across the various lessons.

Positions 7–10 of the @page[ ] array variable specifies the destination page number of lesson-specific navigational controls in order to provide flexibility in developing interesting lessons. In the example, the values of "0" for these positions means that no lesson-specific navigational controls are specified.

Position 11 specifies the destination page number for a timer navigational item that is automatically activated after the passage of a specified amount of time. In the example, the destination page number is "400010," which happens to be page specified by the "next" button position.

Positions 12–16 specify various parameters for some of the content of the displayed page, including text and buttons, generically called "smart objects." Smart objects can display text and perform some additional interactivity, such as asking the student for input. In this manner, tests and quizzes can be implemented. Smart objects can also save information, such as which questions were answered correctly, in a variable file for other programs to access.

Position 17 enables automatic navigation to another page, so that a user need not press a button after the completion of presenting multimedia content or interacting through smart objects. In the example, this field is set to "no wait." Position 18 specifies the name of an animation file to be displayed.

Other array variables govern the presentation of multimedia content. The @sub[ ] array variable, for example, specifies information about invoking subroutines, which are interactive with the student. For example, a subroutine can ask the student a question on a quiz and receiver the student's answer. The @media[ ] array variable specifies information about the name of an audio file to be played, the name and screen co-ordinates of a video file to be played. Finally, the @delete[ ] array variable is used to specify the removal of smart objects from the display.

One of the variables in the lesson is an @initcount variable, which specifies the page number of the first page of the lesson to be displayed to the student when the lesson engine 310 starts. The @initcount variable is typically set to a default value, such as 2000, which by convention denotes the first page of the lesson; however, the @initcount variable may be set based on a previously saved bookmark value.

In step 602, the lesson engine 310 sets a working variable, called @count, to the value of the @initcount variable. The @count variable is the variable which controls which page of the lesson is to be displayed. In step 604, the lesson engine 310 causes the student workstation to display the page indicated by the @count variable. Specifically, the lesson engine looks up information about the displayed pages from the various array variables, indexed by the @count variable. For example, if the @count variable has a value of 2000, then the lesson engine 310 looks up the values stored in the @page[2000] array variable entry.

At step 606, the lesson engine 310 presents the multimedia content referenced in the @sub[@count] and @media [@count] array variable entries. The references to the multimedia content employ the filename of the multimedia content. For example, if the multimedia content is a graphic of a sailboat that is stored in a file called "a0030201.pcx" then that filename is what is stored in the array variable entries.

The lesson engine 310 takes the filename of the multimedia content and presents the multimedia content in a manner appropriate to the nature of the multimedia content. For example, if the multimedia content is a video file, then the video file is played at a location on the screen. If the multimedia content is an audio file, then the audio file is played through speakers, part of audio/video player 226, attached to the workstation. If the multimedia content is an animation, then the animation is displayed at a location on the screen.

At step 608, the lesson engine 310 displays the navigational controls, which are usually buttons, then waits for input from the student (step 610). If the student activates a navigational control, then control passes to step 612, where the page number associated with the navigational control is inspected. If the page number has the special value of "exit", then the lesson engine 310 terminates the interactive multimedia training application. For other values of page numbers, the @count variable is updated to that page number (step 614) and control loops back to step 604, where the new page is displayed.

Thus, each page of the lesson file includes a variety of navigational items that can point to any other page. Therefore, the courseware developer has much flexibility in designing the flow of the lesson. In addition, the lesson file has references for a rich variety of multimedia content for each page. Thus, the courseware developer also has much flexibility in using multimedia.

Accordingly, the inherent flexibility in the design of the lesson engine 310 and the lesson file 306 greatly contributes to improving the effectiveness of corporate training programs. For example, interactive, multimedia training programs are more interesting than traditional leader-led training, improving employee satisfaction and ultimately productivity.

In addition, running several lesson engines 310 in a performance lab 130 allows each student to learn at his or her own pace. Thus, bright students are not kept back, and slower students are not intimidated.

Retention is improved because of the interactive nature of the lesson engine 310. Recall that one study has shown that non-interactive, leader-led training has retention levels from 20% to 40%. However, the same study shows that interactive training boosts retention levels to around 70%. Another study found that interactive video-based instruction had a 25–50% higher content retention rate over classroom instruction.

Because the lesson-specific content is not found in the lesson engine 310 itself, but in a lesson file and multimedia content files, the lesson engine 310 is able to run different lessons with a consistent user-interface. Thus, students do not have to relearn how to use a computer-based training application.

Providing a consistent user-interface also produces the benefit of allowing courseware developers to concentrate on the actual content of the lessons rather than the look-and-feel. In this manner, new training applications can be developed in a shorter amount of time, because the user-interface is already designed and implemented through the lesson engine.

Lesson Authoring Tool

Although lesson files provide much power and flexibility in delivering previously developed courseware, the compact nature of the lesson file was found to hamper the development of new courseware. For example, the lesson file achieves its platform-independence by being implemented as a text file. However, since the lesson file is a text file, it is difficult to visualize each page as it will be displayed in the lesson engine. In fact, courseware developers had to resort to designing each page of the lesson on a piece of paper, called a paper storyboard.

Furthermore, it is hard to find the specific areas of the lesson file to make modifications. For example, the twelfth position in a @page[ ] array variable entry is difficult to discern, because each position is only separated from another position by a slash character (/).

Figure 7:
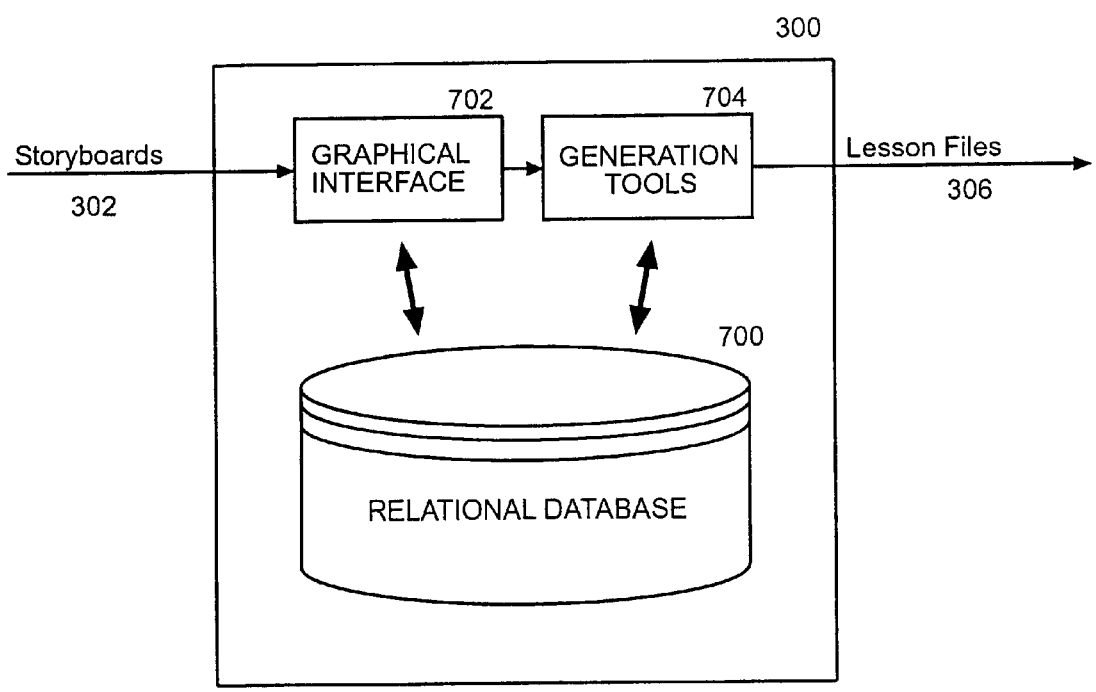
FIG. 7 is a dataflow diagram illustrating the software components of a lesson authoring tool according to an embodiment.

Accordingly, one aspect of the invention is a lesson authoring tool, which facilitates the development of lesson files. The lesson authoring tool comprises three major software components: a relational database 700, a graphical interface 702, and a generation tool 704, depicted in FIG. 7.

A courseware developer inputs a series of computerized storyboards 302 into the graphical interface 702. Each storyboard 302 represents a page to be displayed by the lesson engine. When a storyboard is being input or edited, the graphical interface 702 displays a form having input fields through which the various variables relating to the page may be inspected and modified.

Figure 8:
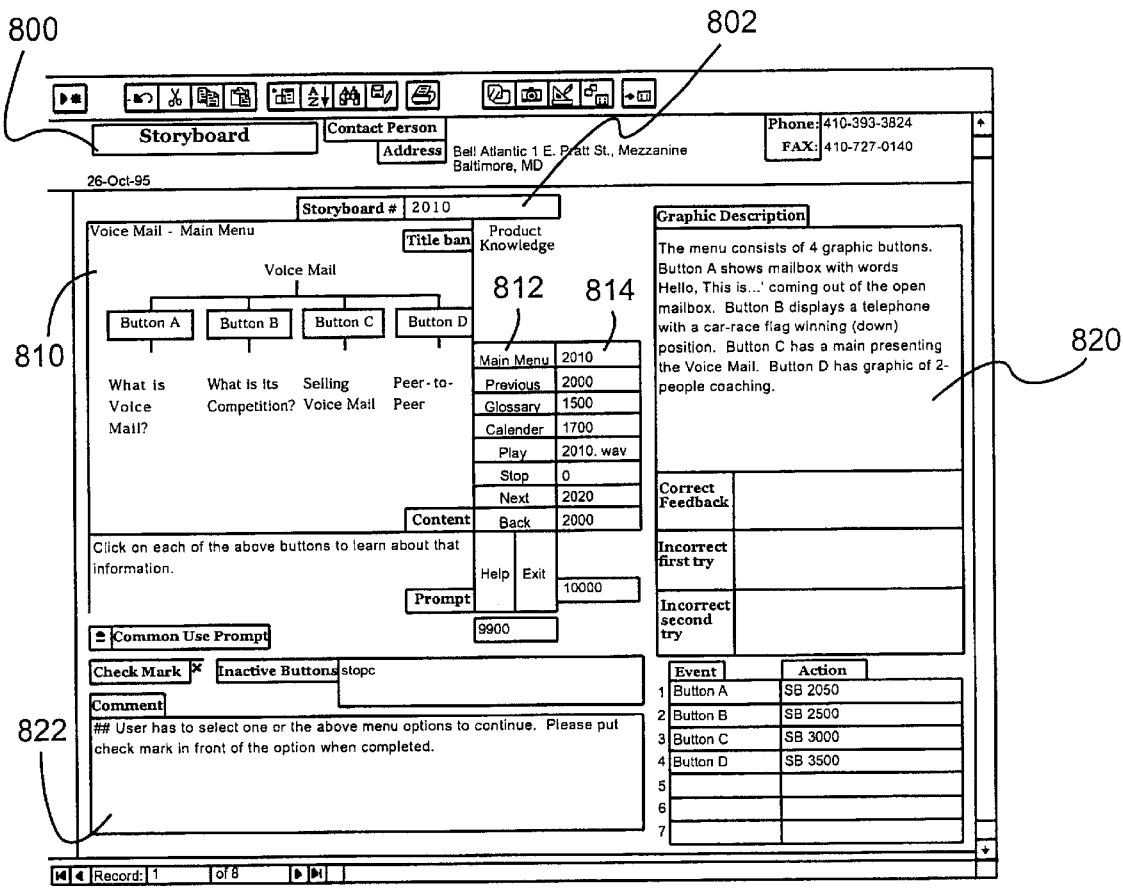
FIG. 8 is a screen display of the lesson authoring tool, showing an exemplary storyboard form.

Referring to FIG. 8, depicted is an exemplary storyboard form 800. Storyboard form 800 comprises a number of input fields. Input field 802 allows the courseware developer to inspect and modify the storyboard number, in this example, 2010. A default value of the storyboard is automatically assigned by the lesson authoring tool, when a new storyboard is input. In particular, the default storyboard number assigned is ten greater than the previous storyboard number. The storyboard number corresponds the page number in the lesson file.

A feature of the storyboard form 800 is a graphical representation 810 of the corresponding page as it would look when displayed by the lesson engine. The page graphical representation also includes a set of input fields for navigational items, which correspond to the navigational controls displayed by the lesson engine. For example, navigational item 812 corresponds to the "main menu" button navigational control in the lesson engine. Juxtaposed to the navigation item 812 is an input field 814 for the number of the destination storyboard. Since storyboard numbers correspond to page numbers, input field 814 is the means by which the destination page number for the "main menu" button is inspected and modified.

Also included in the storyboard form 800 is a description input field 820 of the storyboard. The description input field 820 allows the developers to make notes and comments about each storyboard, reducing the amount of the supplemental paper documentation about the lesson and its design. In addition, there is a comment input field 822, which is devoted for comments concerning the operation of the page.

As storyboards are input or modified, they are saved by the lesson authoring tool in a relational database 700, the second component of the lesson authoring tool. The relational database allows the storyboards to be stored in a form that is easy to access and edit. A preferred embodiment of the inventions uses the Microsoft Access database, from Microsoft Corp. of Redmond, Wash.; however, persons of skill in the art readily appreciate that other relational databases may be employed.

The third component of the lesson authoring tool is a generation tool 704. The generation tool 704 is responsive to a command from a courseware developer, received through graphical interface 702, for example, through a menu entry. The generation tool 704, fetches information about each storyboard of a lesson and writes a lesson file, in its compact format, based on that information. In this manner, syntactically correct lesson files are easily produced, because human developers no longer need to directly write these files.

Therefore, the lesson authoring tool stores a set of storyboards in relational database 700, input through graphical interface 702 and output as a lesson file through generation tool 704. The stored storyboards can also be printed out directly to create a stack of paper storyboards, if desired.

Consequently, the lesson authoring tool provides a means for reducing the effort in developing new courseware. The lesson authoring tool reduces paperwork by storing storyboards in a relational database, and the graphical representation of a lesson page allows members of a courseware development team to quickly identify and modify portions of a lesson in response to changes in requirements.

In the foregoing specification, the invention has been described with reference to specific embodiments thereof. It will be apparent, however, that various modifications and changes may be made thereto without departing from the broader spirit and scope of the invention. The specification and drawings are, accordingly, to be regarded in an illustrative rather than a restrictive sense.

What is claimed is:

1. A method of instructing a student at a workstation, comprising the steps of:

automatically downloading a lesson engine to the workstation;

receiving a request from the student specifying a lesson file from among a plurality of available lesson files;

in response to said request, downloading said specified lesson file and a plurality of related multimedia content from among a plurality of available multimedia content to the workstation, wherein the step of downloading said specified lesson file and a plurality of related multimedia content from among a plurality of available multimedia content to the workstation includes the steps of:

(a) determining a serial number based on the file name of said specified lesson file;

(b) downloading said specified lesson file to the workstation;
(c) establishing which of said plurality of available multimedia content as said plurality of related multimedia content based on said serial number and the file names of the available multimedia content; and
(b) downloading said plurality of related multimedia content to the workstation; and executing said lesson engine, at the workstation, upon said specified lesson file and the plurality of related multimedia content to present the student with interactive training.

2. A method of instructing a student at a workstation, comprising the steps of:

receiving a request from the student specifying a lesson file from among a plurality of available lesson files;

in response to said request, downloading said specified lesson file and a plurality of related multimedia content from among a plurality of available multimedia content to the workstation; and executing a platform-independent lesson engine, at the workstation, upon said specified lesson file and the plurality of related multimedia content to present the student with interactive training.

3. The method of claim 2, wherein:

said specified lesson file includes a plurality of pages, wherein each page includes a reference to one of said plurality of related multimedia content and a navigational item associated with a destination page; and the step of executing a platform-independent lesson engine upon said specified lesson file and said plurality of related multimedia content includes the steps of:
instructing said student based on a page of the plurality of pages of said specified lesson file;
displaying a navigational control associated with the navigational item included in the page;
detecting an activation of said navigational control; and
in response to said activation, instructing said student based on the destination page associated with said navigational item.

4. The method of claim 3, wherein the step of instructing said student based on a page of the plurality of pages of said specified lesson file includes the steps of:

displaying a page of the plurality of pages of said specified lesson file; and presenting one of the related multimedia content based on the reference included in said page.

5. The method of claim 4, wherein the step of displaying a page of the plurality of pages of said specified lesson file includes the steps of:

reading a page number from a file; and displaying a page of the plurality of pages of said specified lesson file having the page number.

6. The method of claim 4, wherein the step of presenting one of the related multimedia content based on the reference included in said page includes the step of playing an audio file.

7. The method of claim 4, wherein the step of presenting one of the related multimedia content based on the reference included in said page includes the step of playing a video file.

8. The method of claim 4, wherein the step of presenting one of the multimedia content based on the reference included in said page includes the step of displaying animation.

9. A method of instructing a student at a workstation, comprising the steps of:

receiving a request from the student specifying a lesson file from among a plurality of available lesson files;

in response to said request, downloading said specified lesson file and a plurality of related multimedia content from among a plurality of available multimedia content to the workstation, wherein the step of downloading said specified lesson file and a plurality of related multimedia content from among a plurality of available multimedia content to the workstation includes the steps of:
(a) determining a serial number based on the file name of said specified lesson file;
(b) downloading said specified lesson file to the workstation;
(c) establishing which of said plurality of available multimedia content as said plurality of related multimedia content based on said serial number and the file names of the available multimedia content; and
(d) downloading said plurality of related multimedia content to the workstation; and executing a platform-independent lesson engine, at the workstation, upon said specified lesson file and the plurality of related multimedia content to present the student with interactive training.

10. The method of claim 2, wherein the step of receiving a request from the student specifying a lesson file of a plurality of lesson files includes the steps of:

displaying a list of lessons based on the identity of the student, each lesson associated with a lesson file of said plurality of available lesson files;

receiving input from the student indicating a selected lesson of said list of lessons; and establishing a lesson file associated with said selected lesson as said specified lesson file.

11. The method of claim 2, further comprising the step of collecting information about the student's interaction with said lesson engine.

12. A computer readable medium having stored thereon sequences of instructions for instructing a student at a workstation, said sequences of instructions including sequences of instructions for causing said workstation to perform the steps of:

automatically downloading a lesson engine to the workstation;

receiving a request from the student specifying a lesson file from among a plurality of available lesson files;

in response to said request, downloading said specified lesson file and a plurality of related multimedia content from among a plurality of available multimedia content to the workstation, wherein the step of downloading said specified lesson file and a plurality of related multimedia content from among a plurality of available multimedia content to the workstation includes the steps of:
(a) determining a serial number based on the file name of said specified lesson file;
(b) downloading said specified lesson file to the workstation;
(c) establishing which of said plurality of available multimedia content as said plurality of related multimedia content based on said serial number and the file names of the available multimedia content; and
(d) downloading said plurality of related multimedia content to the workstation; and invoking said lesson engine upon said specified lesson file and the plurality of related multimedia content to present the student with interactive training.

13. A computer readable medium having stored thereon sequences of instructions for instructing a student at a workstation, said sequences of instructions including sequences of instructions for causing said workstation to perform the steps of:

receiving a request from the student specifying a lesson file of a plurality of lesson files;

in response to said request, downloading said specified lesson file and a plurality of related multimedia content from among a plurality of available multimedia content to the workstation; and executing a platform-independent lesson engine upon said specified lesson file and the plurality of related multimedia content to present the student with interactive training.

14. A computer readable medium having stored thereon sequences of instructions for instructing a student at a workstation, said sequences of instructions including sequences of instructions for causing said workstation to perform the steps of:

receiving a request from the student specifying a lesson file of a plurality of lesson files;

in response to said request, downloading said specified lesson file and a plurality of related multimedia content from among a plurality of available multimedia content to the workstation, wherein the step of downloading said specified lesson file and a plurality of related multimedia content from among a plurality of available multimedia content to the workstation includes the steps of:

(a) determining a serial number based on the file name of said specified lesson file;

(b) downloading said specified lesson file to the workstation;

(c) establishing which of said plurality of available multimedia content as said plurality of related multimedia content based on said serial number and the file names of the available multimedia content; and (d) downloading said plurality of related multimedia content to the workstation; and executing a platform-independent lesson engine upon said specified lesson file and the plurality of related multimedia content to present the student with interactive training.

15. The computer readable medium of claim 13, wherein the step of receiving a request from the student specifying a lesson file of a plurality of available lesson files includes the steps of:

displaying a list of lessons based on the identity of the student, each lesson associated with a lesson file of said plurality of available lesson files;

receiving input from the student indicating a selected lesson of said list of lessons; and establishing a lesson file associated with said selected lesson as said specified lesson file.

16. An interactive training network, comprising:

a storage device for storing courseware, said courseware comprising a plurality of multimedia content and a plurality of lesson files, wherein each lesson file includes a plurality of references to multimedia content; and a plurality of workstations, wherein a workstation is networked to said storage medium and includes:

a lesson delivery system for downloading a lesson file and the multimedia content referenced in the lesson file from said storage medium to storage in the workstation based on input from a student, wherein said lesson delivery system includes:

(a) a login mechanism for receiving a student identifier from a student;

(b) means for displaying a list of lessons based on said student identifier and information about students stored in a database, wherein each lesson is associated with a lesson file;

(c) means for receiving input from the student indicative of a selected lesson;

(d) means for determining a serial number embedded in the file name of the lesson file associated with the selected lesson; and (e) means for downloading said specified lesson file and multimedia content having file names containing said serial number; and a lesson engine for instructing said student based on said specified lesson file and presenting the multimedia content at the workstation to said student.

17. The interactive training network of claim 16, wherein said lesson engine includes a video player.

18. The interactive training network of claim 16, wherein said lesson engine includes an audio player.

19. The interactive training network of claim 16, wherein said lesson engine includes an animation player.

20. An apparatus for authoring courseware, comprising:

a database;

means for inputting a storyboard, wherein a storyboard includes a navigational item associated with a second storyboard and a reference to multimedia content;

means for assigning a default value as a storyboard number as each of said plurality of storyboards is input;

means for displaying a graphical representation of said storyboard;

means for storing said storyboard into said database;

means for retrieving a plurality of storyboards from said database; and means for generating a lesson file from said plurality of storyboards, wherein said lesson file comprises a plurality of pages, wherein a page includes a navigational item associated with one of said plurality of pages and said reference to multimedia content.

21. A method of creating a lesson file, comprising a plurality of pages, wherein a page includes a navigational item associated with one of said plurality of pages and a reference to multimedia content, comprising the steps of:

inputting a plurality of storyboards, wherein a storyboard includes a navigational item associated with a second storyboard and a reference to multimedia content;

assigning a default value as a storyboard number when each of said plurality of storyboards is input;

displaying a graphical representation of said storyboard; and generating, from said plurality of storyboards, a lesson file comprising a plurality of pages, wherein a page includes a navigational item associated with one of said plurality of pages and said reference to multimedia content.

22. A computer readable medium having sequences of instructions stored thereon for creating a lesson file, comprising a plurality of pages, wherein a page includes a navigational item associated with one of said plurality of pages and a reference to multimedia content, said sequences of instructions comprising sequences of instructions for performing the steps of:

inputting a plurality of storyboards, wherein a storyboard includes a navigational item associated with a second storyboard and a reference to multimedia content;

assigning a default value as a storyboard number when each of said plurality of storyboards is input;

displaying a graphical representation of said storyboard; and generating, from said plurality of storyboards, a lesson file comprising a plurality of pages, wherein a page includes a navigational item associated with one of said plurality of pages and said reference to multimedia content.

* * * * *